(12) United States Patent
Asami

(10) Patent No.: US 8,567,172 B2
(45) Date of Patent: Oct. 29, 2013

(54) CONNECTING UNIT, BAND AND ELECTRONIC DEVICE INCLUDING BAND

(71) Applicant: Casio Computer Co., Ltd., Tokyo (JP)

(72) Inventor: Kiyoshi Asami, Higashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/705,420

(22) Filed: Dec. 5, 2012

(65) Prior Publication Data

US 2013/0145795 A1    Jun. 13, 2013

(30) Foreign Application Priority Data

Dec. 13, 2011  (JP) ................................. 2011-272119

(51) Int. Cl.
*F16G 15/04*    (2006.01)

(52) U.S. Cl.
USPC ................................ 59/80; 59/82; 63/4; 63/7

(58) Field of Classification Search
USPC ..................... 59/80, 82, 85; 63/4, 7
See application file for complete search history.

(56) References Cited

U.S. PATENT DOCUMENTS

| | | | |
|---|---|---|---|
| 6,170,250 B1 * | 1/2001 | Hara et al. | 59/80 |
| 6,237,319 B1 * | 5/2001 | Amundsen et al. | 59/82 |
| 6,406,177 B1 * | 6/2002 | Fukushima et al. | 59/80 |
| 7,191,586 B2 * | 3/2007 | Yamamoto | 59/82 |

FOREIGN PATENT DOCUMENTS

JP        60-182811 U    12/1985

* cited by examiner

*Primary Examiner* — David B Jones
(74) *Attorney, Agent, or Firm* — Holtz, Holtz, Goodman & Chick, PC

(57) ABSTRACT

A connecting unit including an outer frame member having a pair of hole sections, a pair of first connecting sections and long holes for inserting a controller. The connecting unit further includes a holding frame body which includes through-holes at positions corresponding to the long holes, slide members which include a second connecting section which protrudes and retracts from the pair of hole sections and slide in the extending direction of the long holes by slide operation of the controller, elastic members which bias the slide members to an opposite direction of an insertion direction of the controller and a locking member which locks the slide member at a position where connection between the second connecting section and the first connecting section of the adjacent segment members is released.

4 Claims, 11 Drawing Sheets

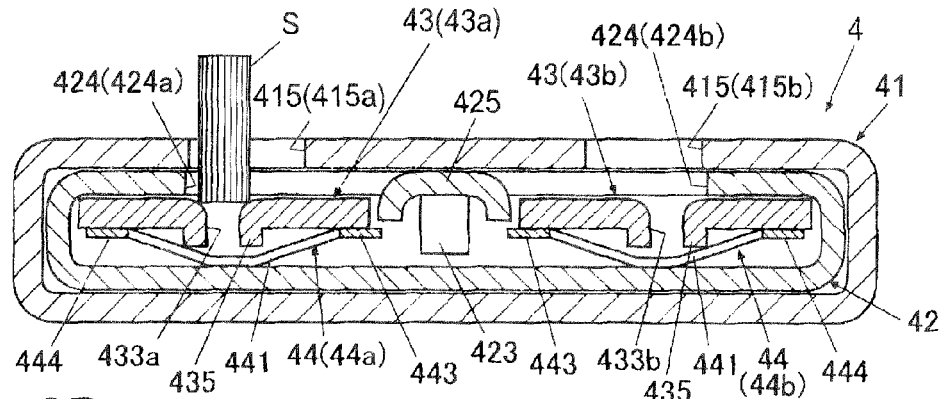

CONNECTING UNIT, BAND AND ELECTRONIC DEVICE INCLUDING BAND

BACKGROUND OF THE INVENTION

1. Field of the Invention

The present invention relates to a connecting unit, a band and an electronic device including the band.

2. Description of Related Art

Generally, as a band such as a wristwatch band formed by connecting a plurality of segment members and as a connecting unit of the segment members, in cited document 1 (Japanese Utility Model Application Laid Open Publication No. S60-182811), there is described a type which is configured so that a pair of first pipes are provided at an end of the segment member, a second pipe disposed between the pair of first pipes is provided at an end of another segment member which is connected to the segment member, and a pin member is inserted to each pipe of the first and the second pipes in the state where the second pipe and the pair of first pipes are disposed in series to sequentially connect a plurality of segment members.

Such a band and a connecting unit thereof of a wristwatch and the like are configured so that a stepped hole including a small diameter hole section and a large diameter hole section inside the second pipe is formed, a fastening ring is fit into the large diameter hole section of the stepped hole and a pin member inserted into each of the first and second pipes is fastened by the fastening ring so as to prevent the pin member from getting out of the side of the band, for example.

However, in a band which is formed by connecting a plurality of segment members, strong force is applied to a portion connecting the segment members in a case where the segment members move when the band is used, for example.

Therefore, as described in Patent Document 1, when a fastening ring for preventing falling off of the pin member is disposed inside the second pipe, the fastening ring is easily affected by the move between the segment members and is easily deformed due to applied pressure and ablation with use.

Further, there is also a possibility that strength cannot be maintained due to corrosion of the fastening ring and such like by sweat and such like coming in from between the first pipes and the second pipe.

In such case where a fastening ring is deformed or strength of the fastening ring is lowered, there is a problem that a pin member which is fastened to be fixed by the fastening ring is easy to fall off.

On the other hand, if the pin member is completely fixed so as not to fall off from the band, there is a problem that the segment member cannot be attached and removed without using a special tool or the like and a general user who purchased a wristwatch or the like including the band cannot adjust the length of the band easily.

Though a shop assistant or the like performs adjustment when the wristwatch or the like is purchased at a shop, it is inconvenient if the general user cannot attach and remove a segment member to adjust the size of the band by himself or herself when size adjustment is needed after purchase of the wristwatch or when the wristwatch is purchased by mail order, for example.

SUMMARY OF THE INVENTION

An object of the present invention is to provide a connecting unit by which a segment member can be easily attached or removed without a special tool or technique, a band of which length can be adjusted easily by the connecting unit and an electronic device which includes the band.

In order to achieve the above object, according to one aspect of the present invention, there is provided a connecting unit, including an outer frame member having a pair of hole sections which are provided at sides of a protruding portion which protrudes at one side in a connecting direction of adjacent segment members which are connected to each other, a pair of first connecting sections which are provided at portions corresponding to the pair of hole sections of a segment member in a receiving portion which is provided at the other side in the connecting direction and receives the protruding portion and long holes for inserting a controller which are formed so as to extend in a width direction which is orthogonal to the connecting direction; a holding frame body which is housed in the outer frame member and includes through-holes at positions corresponding to the long holes; slide members which are held in the holding frame body, include a second connecting section which protrudes and retracts from the pair of hole sections and slide in the extending direction of the long holes by slide operation of the controller; elastic members which are respectively provided between the slide members and the outer frame member and bias the slide members to an opposite direction of an insertion direction of the controller; and a locking member which locks the slide member at a position where connection between the second connecting section and the first connecting section of the adjacent segment members is released by the controller sliding the slide member in the extending direction of the long hole against the elastic bias force of the elastic member.

Preferably, a concave section or a hole section to which the controller is to be inserted is formed at a position corresponding to the long hole of the outer frame member in each of the slide members.

Preferably, there is provided a band including the connecting unit, and the band is formed by connecting a plurality of segment members.

Preferably, there is provided an electronic device, including the band and an outer case to which the band is attached.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein:

FIG. 8A is a sectional view showing a state where a controller is inserted;

FIG. 8B is a sectional view showing a state where a controller presses a slide member;

FIG. 8C is a sectional view showing a state where a controller slides the slide member;

FIG. 8D is a sectional view showing a state where the slide member is moved under a locking piece;

DETAILED DESCRIPTION OF THE PREFERRED EMBODIMENT

Hereinafter, a preferred embodiment of a connecting unit, a band and an electronic device including the band according to the present invention will be described with reference to FIGS. 1 to 11.

Though a case where an electronic device according to the present invention is a wristwatch will be described hereinafter, an embodiment to which the present invention can be applied is not limited to this.

Figure 1:
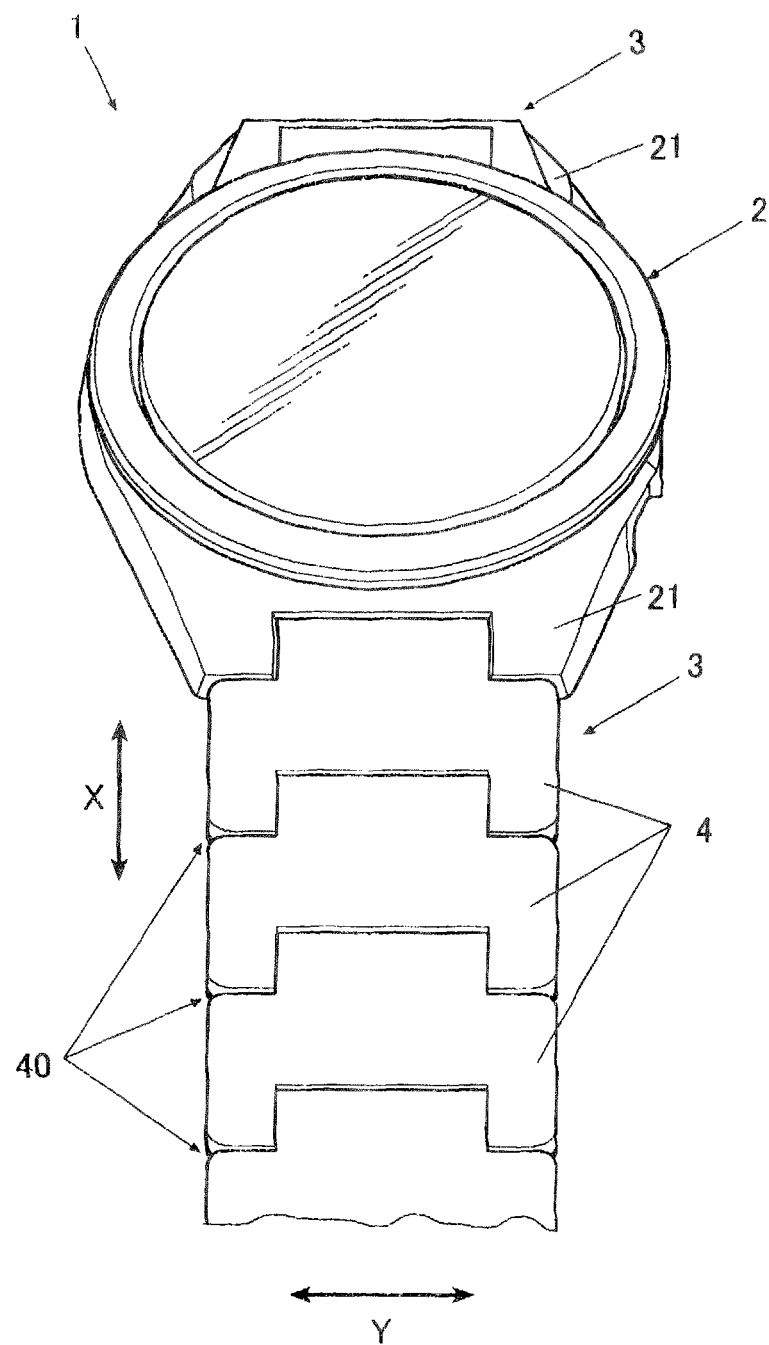
FIG. 1 is a schematic view of a wristwatch which includes a band formed of segment members which are connected to each other by connecting units according to the embodiment.

FIG. 1 is a schematic view of a wristwatch as an electronic device according to the embodiment.

As shown in FIG. 1, in the embodiment, a wristwatch 1 includes a band 3 and a case 2 as an outer case to which the band 3 is attached.

At both of the upper and lower end portions (the upper and lower end portions in FIG. 1) of the case 2, that is, at the end portion of 12 o'clock side and at the end portion of 6 o'clock side, band attaching sections 21 to which the band 3 is attached are formed.

Inside the case 2, a display unit and such like of the wristwatch 1 as an electronic device and various types of electronic components and such like (not shown in the drawings) for operating the display unit and such like are housed.

Figure 2:
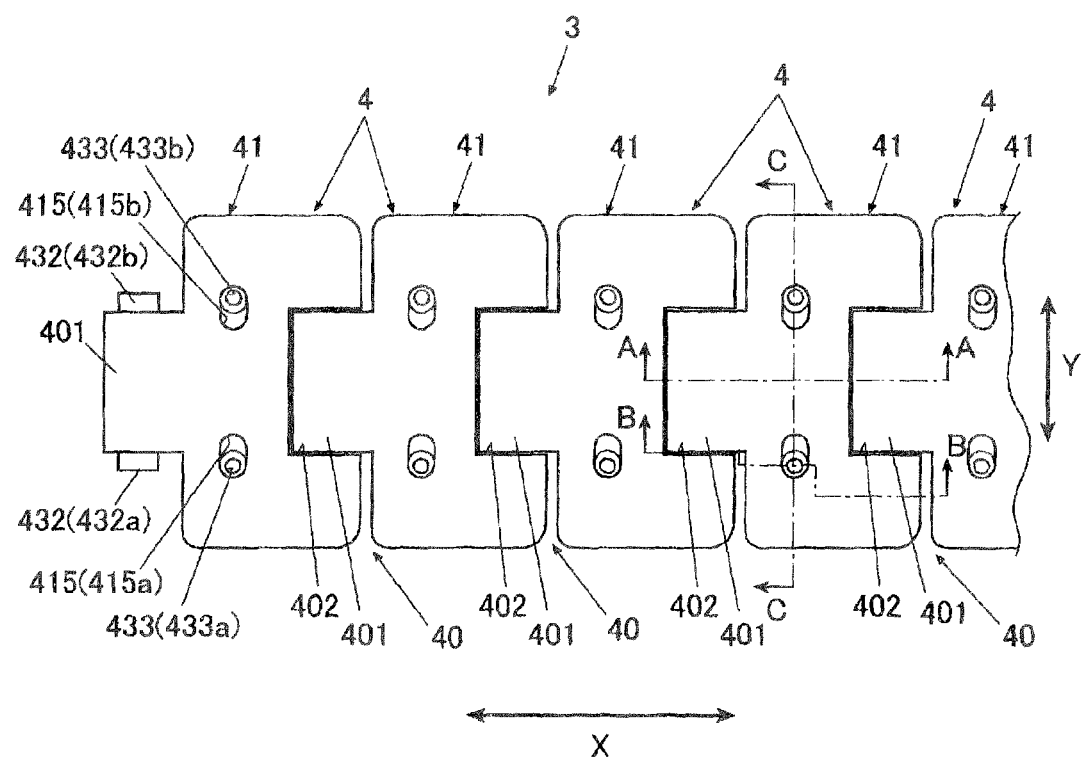
FIG. 2 is a plan view of the band in FIG. 1.

FIG. 2 is a plan view of the band 3 in the embodiment seen from the back side (the opposite side of the visible side of the wristwatch 1, that is, the side which contacts the arm).

Figure 3:
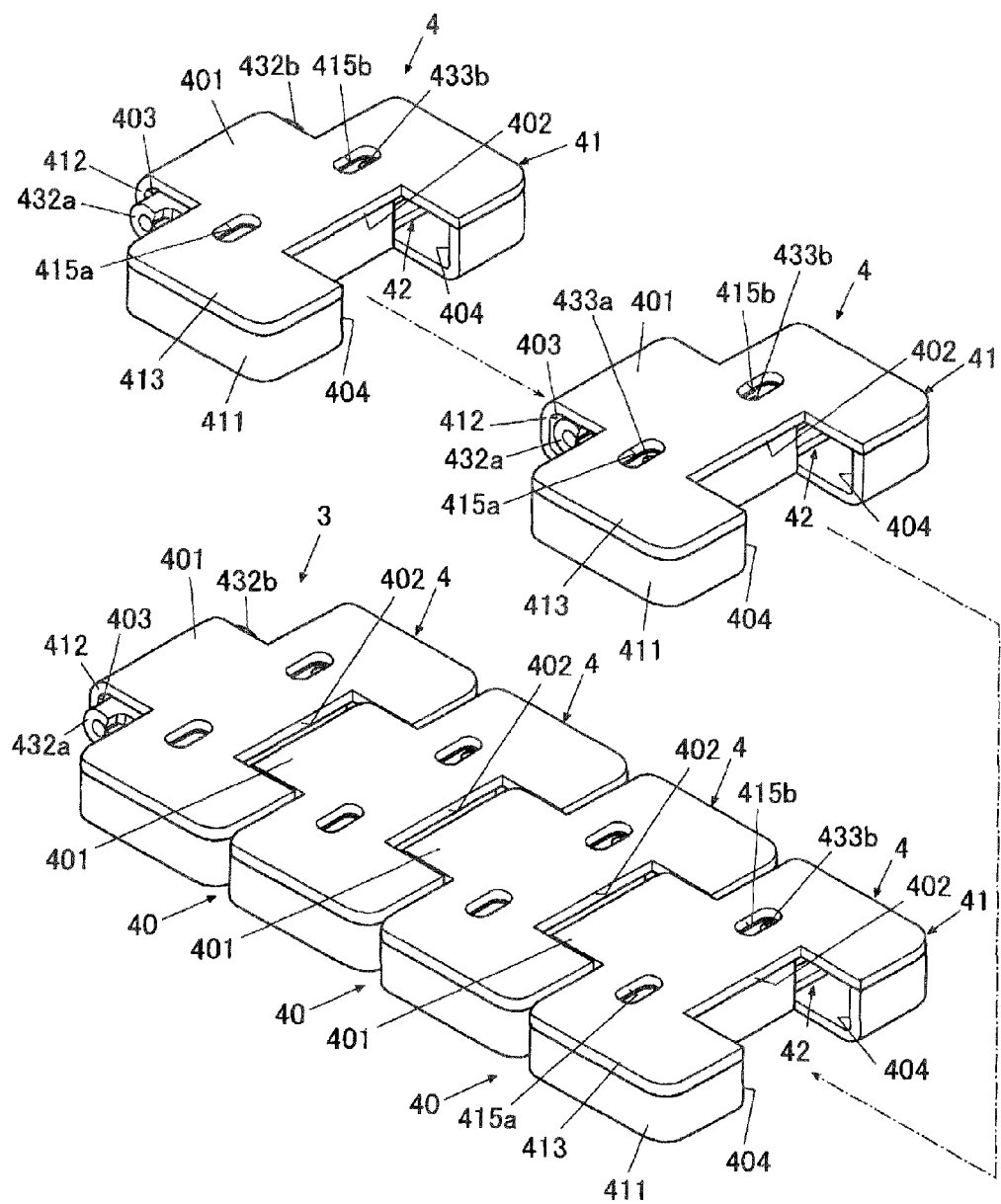
FIG. 3 is a schematic view of the band and segment members in FIG. 1.

FIG. 3 is a schematic view showing a band 3 in the embodiment and segment members 4 which are included in the band 3.

As shown in FIGS. 1 to 3, in the embodiment, the band 3 includes connecting units 40, and a plurality of segment members 4 are connected to each other by the connecting units 40.

Here, the band 3 only needs to include some segment members 4 which are connected to each other by the connecting unit 40 and all the segment members 4 included in the band 3 may not be connected by the connecting units 40.

A plurality of segment members 4 may be connected by at least one connecting unit 40.

Figure 4:
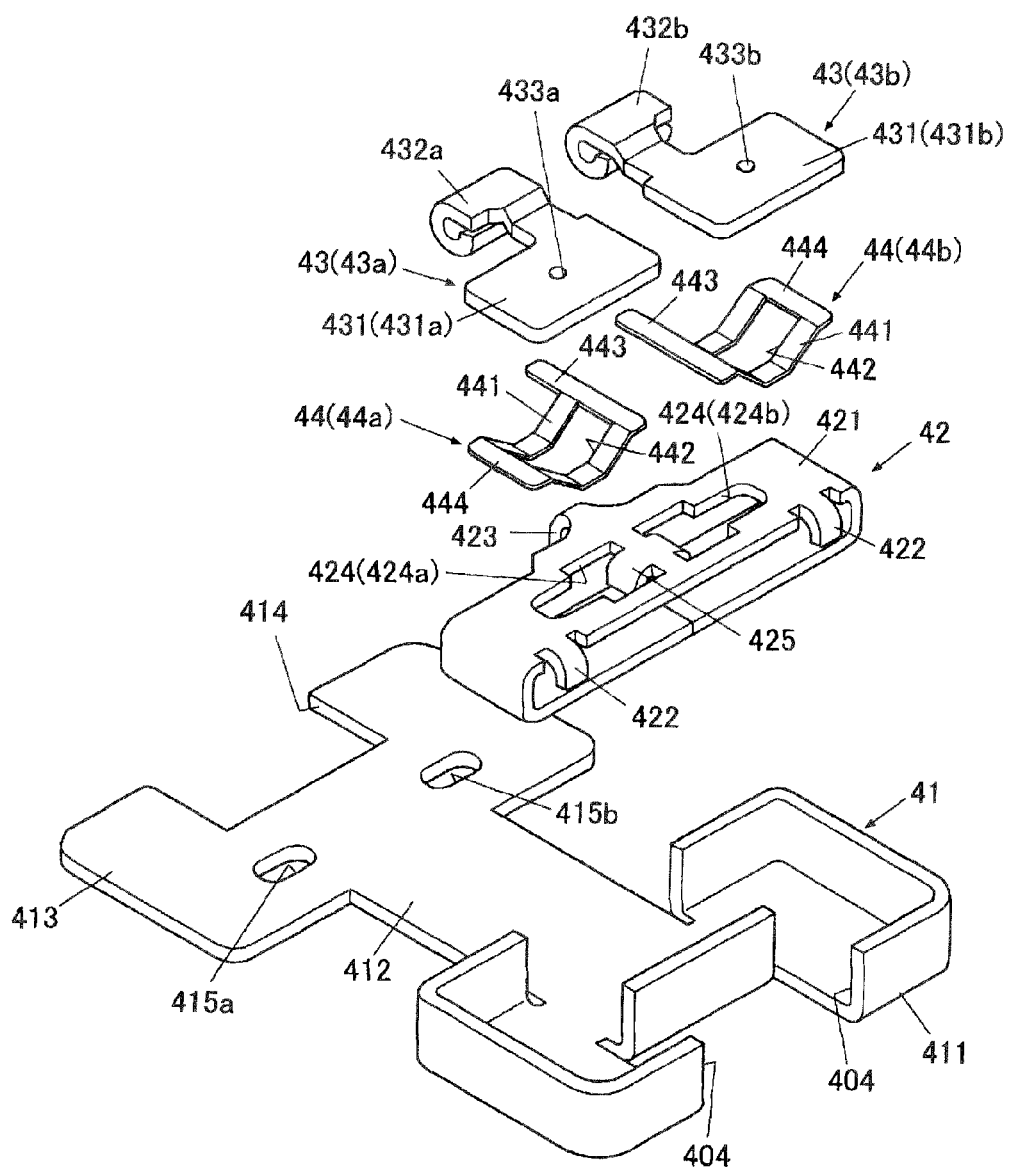
FIG. 4 is an exploded schematic view of a segment member in FIG. 1.

FIG. 4 is an exploded schematic view of a segment member 4 of the embodiment.

Figure 5A:
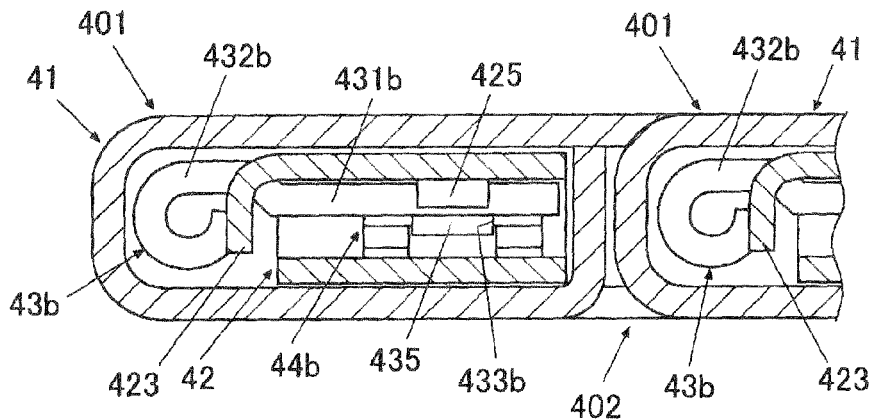
FIG. 5A is a sectional view cut along the line A-A in FIG. 2.
Figure 5B:
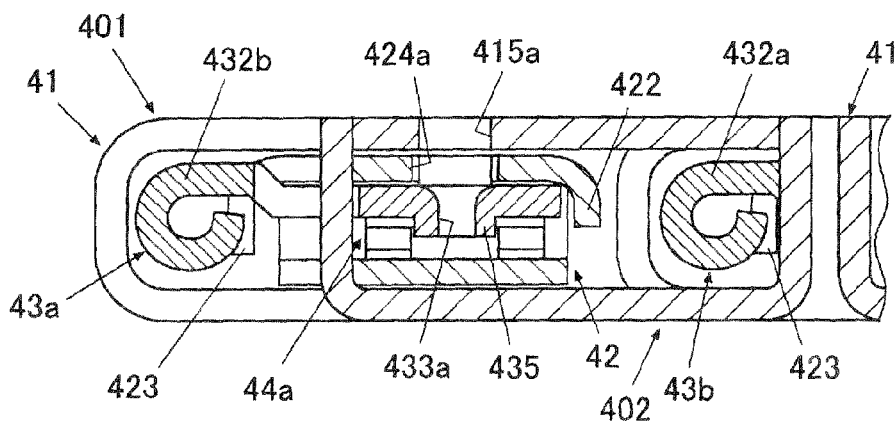
FIG. 5B is a sectional view cut along the line B-B in FIG. 2.
Figure 5C:
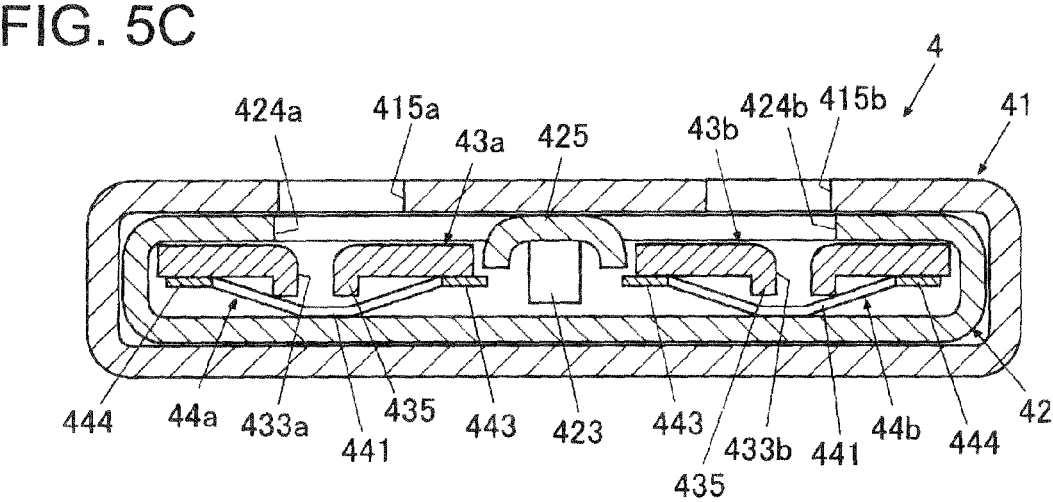
FIG. 5C is a sectional view cut along the line C-C in FIG. 2.

FIG. 5A is a sectional view along the line A-A in FIG. 2.
FIG. 5B is a sectional view along the line B-B in FIG. 2.
FIG. 5C is a sectional view along the line C-C in FIG. 2.

As shown in FIG. 4, a segment member 4 of the embodiment includes an outer frame member 41, a holding frame body 42 which is housed in the outer frame member 41, slide members 43 which are housed in the holding frame body 42, elastic members 44 which are provided at the slide members 43 and a locking piece 425 which restricts the move of the slide members 43.

As shown in FIGS. 2 to 5C, the outer frame member 41 includes a convex section 401 as a protruding portion which protrudes atone side in a connecting direction X which connects adjacent segment members 4 to each other and a concave section 402 as a receiving portion which receives the convex section 401 as a protruding portion (that is, engages with the convex section 401) at the other side in the connecting direction X.

At the sides of the convex section 401 as a protruding portion, a pair of projection in/out holes 403 as hole sections through which after-mentioned insertion projections 432 (that is, the second connecting section) can respectively protrude and retract are provided.

Also, in the concave section 402 as a receiving portion, a pair of projection housing sections 404 as the first connecting section are provided at the portions corresponding to the projection in/out holes 403 which are a pair of hole sections provided at the convex section 401 of the adjacent segment member 4.

Further, at one surface of the outer frame member 41, long holes 415 for inserting a controller through which an external controller S (see FIG. 8) can be inserted are formed so as to extend in the width direction Y which is orthogonal to the connecting direction X of segment members 4.

Here, in the embodiment, as after-mentioned, in order to slide each of the pair of slide members 43 (that is, slide members 43a and 43b and hereinafter, mere "slide members 43" includes both of them) by the external controller S, two long holes 415 (that is, long holes 415a and 415b and hereinafter, mere "long holes 415" includes both of them) corresponding to the two slide members 43a and 43b are disposed in line in the width direction Y of the segment member 4 (that is, the width direction Y of the outer frame member 41).

In the embodiment, the long holes 415 are provided at a back surface (a surface at the opposite side of the visible side of the wristwatch 1, that is, a surface which contacts the arm) of the outer frame member 41.

When the long holes 415 are provided at the back surface of the external frame member 41 in such way, the long holes 415 are not exposed when a user wears the band 3 around the arm, which is visually preferable.

The external controller S which can be inserted through the long holes 415a and 415b is, for example, a toothpick, a pen tip of various types of pens, a driver, a drill or such like. The controller S is not limited to the examples illustrated here as long as the tip is thin to some extent, the controller S can be inserted through the long holes 415a and 415b and can apply pressure to the after-mentioned slide member 43.

In the embodiment, the outer frame member 41 is formed by a sheet of plate made of a metallic material such as stainless steel, for example. As shown in FIG. 4, the outer frame member 41 includes a frame member main body 411 which is opened at the upper surface (the surface which is in upper side in FIG. 4) and has a housing space therein, and a covering section 413 which is connected to the frame member main body 411 via a connecting section 412 and is formed in an approximately same shape as the shape of the frame member main body 411 in plan view.

At the covering section 413, a cutout section 414 is formed at a position corresponding to the concave section 402 in an assembled state.

By forming the outer frame member 41 with one plate in such way, the outer frame member 41 can be easily and effectively produced and the number of parts can be reduced.

The frame member main body 411 is formed by performing pressing process and the like such as shearing process (shearing process, punching process, perforating process) and bending process (folding process) on a part of the plate formed of metallic material, for example.

Further, the outer frame member 41 is configured so that the covering section 413 covers the opening of the upper surface of the frame member main body 411 by performing bending process on the connecting section 412 to fold back the entire plate, and the frame member main body 411 and the covering section 413 are fixed to each other by welding, bonding and the like.

The method of fixing the frame member main body 411 to the covering section 413 is not limited to the example illustrated here.

In the embodiment, the covering section 413 is the back surface (the surface at the opposite side of the visible side of the wristwatch 1, that is, the surface which contacts the arm) of the segment member 4 and the long holes 415a and 415b are formed at the covering section 413. The position, size, shape and the like of the long holes 415a and 415b are not limited to the illustrated examples.

For example, the outer frame member 41 may be configured so that the frame member main body 411 forms the back surface of the segment member 4, and in this case, the long holes 415a and 415b may be formed in the frame member main body 411 side.

Also, in the embodiment, the convex section 401 of the segment member 4 is formed with the connecting section 412 which is folded in a state where the frame member main body 411 and the covering section 413 are fixed to each other.

The holding frame body 42 is housed in the outer frame member 41 and includes through-holes 424 (that is, through-holes 424a and 424b, and hereinafter, mere "through-holes 424" includes both of them) at positions corresponding to the long holes 415a and 415b of the outer frame member 41.

In the embodiment, two slide members 43a and 43b and elastic members 44 respectively provided therein (that is, elastic members 44a and 44b and hereinafter, mere "elastic members 44" includes both of them) are housed in the holding frame body 42.

Figure 6A:
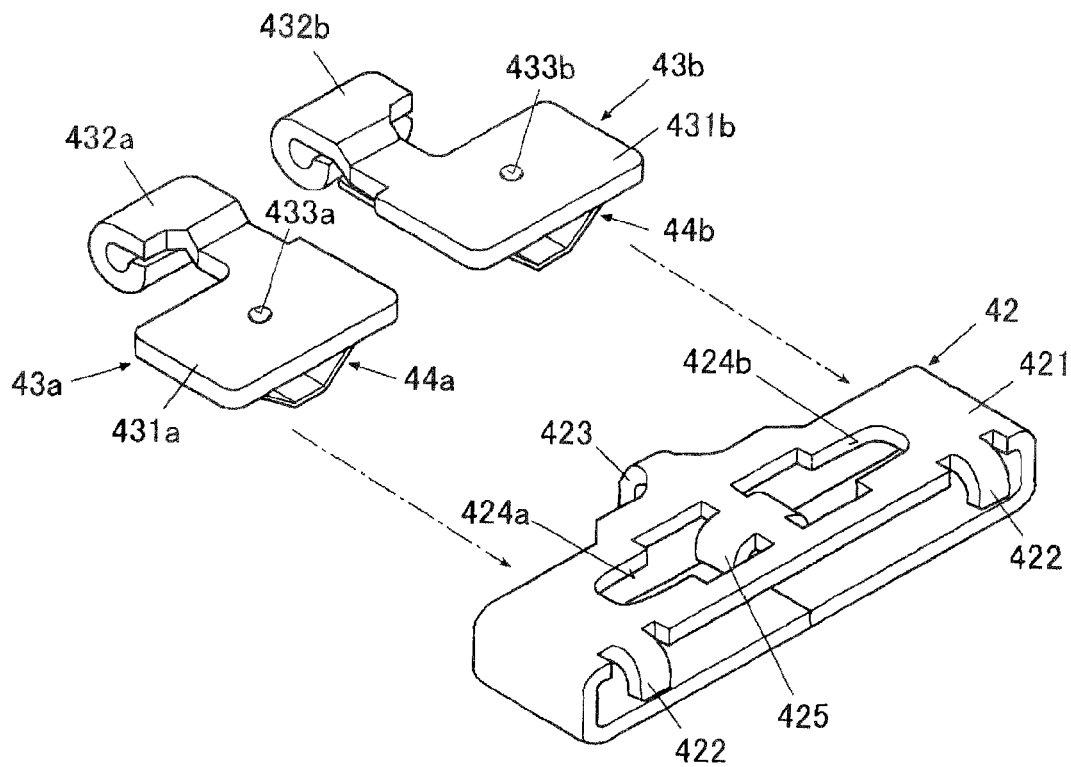
FIG. 6A is an exploded schematic view of slide members and a holding frame body seen from the back side.

FIG. 6A is a schematic view showing the slide members 43, the elastic members 44 and the holding frame body 42 which houses the slide members 43 and the elastic members 44 seen from a back side (the opposite side of a visible side of the wristwatch 1, that is, the side contacting the arm) of the segment member 4.

Figure 6B:
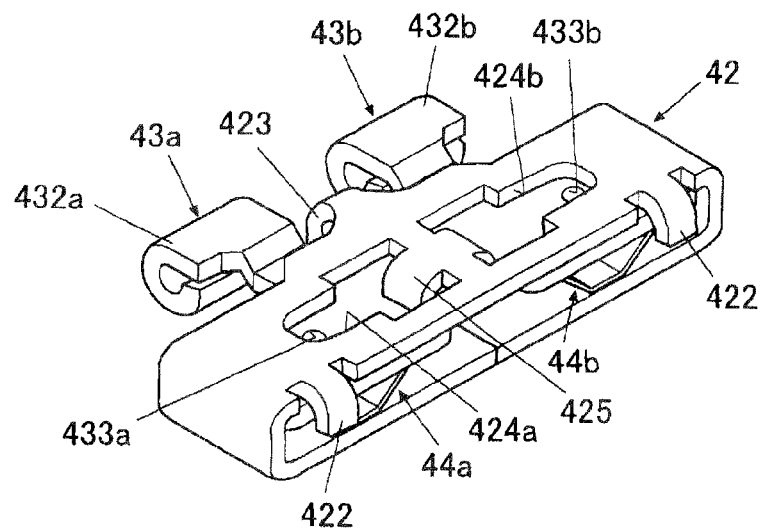
FIG. 6B is a schematic view of a state where slide members are set to the holding frame body seen from the back side.

FIG. 6B is a schematic view showing a state where the slide members 43 and the elastic members 44 shown in FIG. 6A are housed in the holding frame body 42.

Figure 7A:
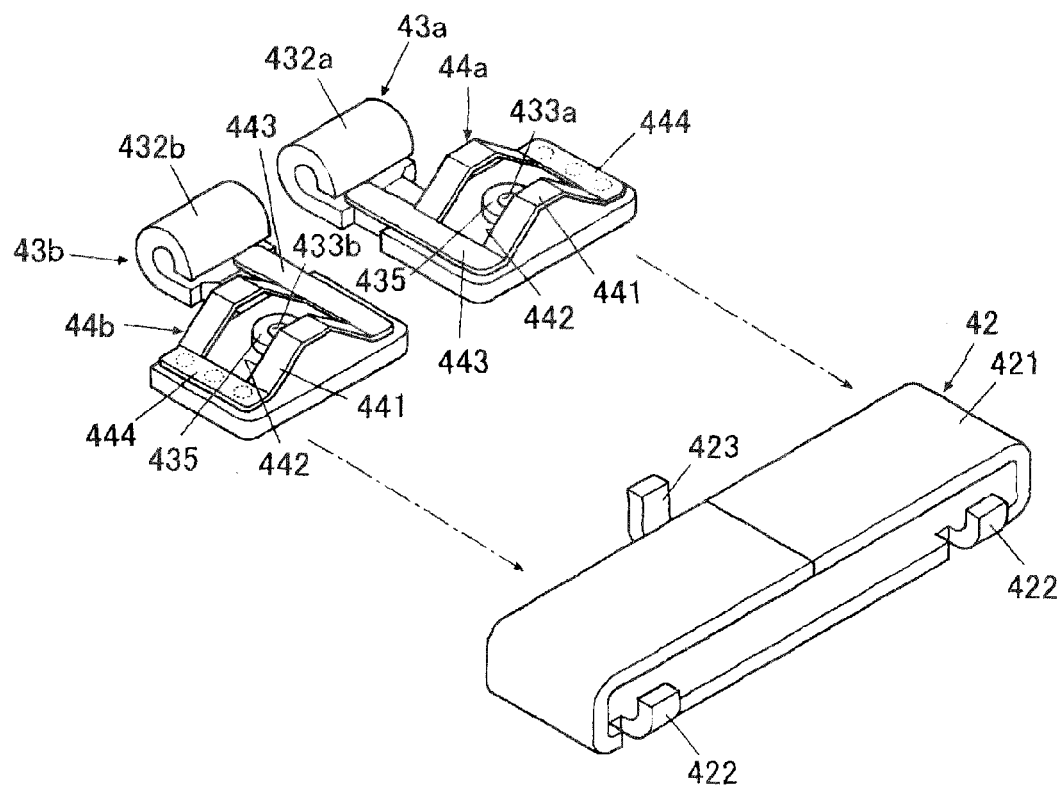
FIG. 7A is an exploded schematic view of slide members and a holding frame body seen from the top side.

Further, FIG. 7A is a schematic view showing the slide members 43, the elastic members 44 and the holding frame body 42 which houses the slide members 43 and the elastic members 44 seen from the top side (visible side of the wristwatch 1) of the segment member 4.

Figure 7B:
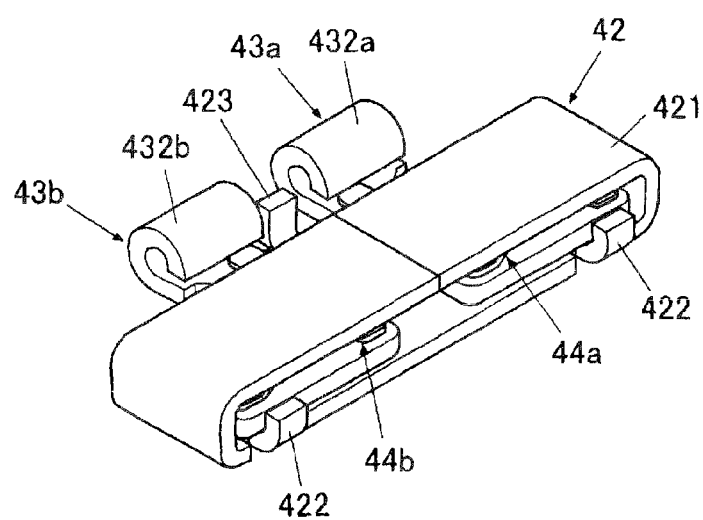
FIG. 7B is a schematic view of a state where slide members are set to the holding frame body seen from the top side.

FIG. 7B is a schematic view showing a state where the slide members 43 and the elastic members 44 shown in FIG. 7A are housed in the holding frame body 42.

As shown in FIGS. 4 to 7B, in the embodiment, the holding frame body 42 includes a holding frame main body 421 which has openings at the front side and at the rear side in the connecting direction X of the segment member 4.

At the rear side of the holding frame main body 421 in the connecting direction X of the segment members 4, rear locking sections 422 which lock the slide members 43 housed in the holding frame body 42 so as not to fall off from the opening at the rear side are provided so as to extend from a back side surface (that is, the back side of the segment member 4, the opposite side of the visible side of the wristwatch 1) of the holding frame main body 421 to cover a part of the rear side opening.

By including the rear locking sections 422 to prevent the falling off in such way, assembly workability when the slide member 43 is assembled into the holding frame body 42 becomes better.

Further, at the front side of the holding frame main body 421 in the connecting direction X of the segment members 4, a front locking section 423 which positions the slide members 43 so that the two slide members 43a and 43b housed in the holding frame body 42 are not too central in the width direction Y of the segment member 4 is provided so as to extend from a back side surface (that is, the back side of the segment member 4, the opposite side of the visible side of the wristwatch 1) of the holding frame main body 421 to cover a part of the front side opening.

Thus, it is possible to prevent the two slide members 43a and 43b from interfering with each other and such like inside the holding frame main body 421.

Here, position, size, shape and the like of the rear locking sections 422 and the front locking section 423 are not limited to the illustrated example. For example, the rear locking sections 422 and the front locking section 423 may be provided so as to extend from the top side surface (that is, the top side of the segment member 4, the visible side of the wristwatch 1) in the holding frame body 42 to cover a part of the rear side opening and the front side opening, respectively.

Here, the rear locking sections 422 and the front locking section 423 are not essential elements for the present invention and there may be a configuration without them.

Also, the holding frame body 42 includes two through-holes 424 (that is, through-holes 424a and 424b and hereinafter, mere "through-holes 424" includes both of them) at positions which are on the back side surface (that is, the back side of the segment member 4, the opposite side of the visible side of the wristwatch 1) of the holding frame main body 421 and correspond to the long holes 415a and 415b of the outer frame member 41.

The through-holes 424 are long holes which extend in the width direction Y of the segment member 4 similarly as the long holes 415a and 415b.

Here, the position, size, shape and such like of the through-holes 424a and 424b are not limited to the illustrated example.

Further, the holding frame body 42 includes a locking piece 425 which restricts the sliding of the slide members 43 in the width direction Y of the segment member 4 at a position which is on a back side of the holding frame main body 421 and is midway between the two through-holes 424a and 424b.

The locking piece 425 extends in the width direction Y of the segment member 4 and the end portions thereof in the width direction Y extend from the back side (that is, the back side of the segment member 4, the opposite side of the visible side of the wristwatch 1) of the holding frame main body 421 toward the inside of the holding frame main body 421.

The locking piece 425 is a locking member which locks the slide members 43 at a position where the connection between the insertion projections 432a and 432b (the second connecting section) and the projection housing sections 404 (the first connecting section) of the adjacent segment members 4 is released by sliding the slide members 43 in the extending direction of the long holes 415a and 415b by the controller S against the elastic biasing force of the elastic members 44.

That is, the locking piece 425 can abut the inner surface of the slide members 43 in a biased state where the slide members 43 are biased by the elastic members 44, and restricts the sliding of the slide members 43 so that the slide members 43 do not move more toward center in the width direction Y than the side portions of the locking piece 425.

Thus, the locking piece 425 locks the slide members 43 at a protruding position where the insertion projections 432 (that is, insertion projections 432a and 432b and hereinafter, the mere "insertion projections 432" includes both of them) protrude from projection in/out holes 403 (see FIGS. 5C and 8A, for example).

Further, when a slide member 43 is pressed in the insertion direction of the controller S by the external controller S, the locked state of the slide member 43 by the locking piece 425 is released by the slide member 43 being pressed down to be lower than the lower surface of the locking piece 425 in this pressed state.

Thus, the slide member 43 can slide in the extending direction of the long holes 415a or 415b (see FIG. 8B, for example).

Further, when the slide member 43 moves to a position where the slide member 43 gets under the locking piece 425 by slide operation of the controller S and the pressed state by the controller S is released, the slide member 43 is pushed up to the opposite direction of the direction to which the controller S presses by the biased force of the elastic member 44 and the slide member 43 is maintained in a state of abutting the lower surface of the locking piece 425.

In this state, the locking piece 425 locks the slide member 43 at a housing position where the insertion projection 432 is housed in the projection in/out hole 403 (see FIGS. 8C and 8D, for example).

In the embodiment, the holding frame body 42 is formed by a plate made of metallic material such as stainless steel and is formed in a predetermined shape by performing pressing process and the like such as shearing process (shearing process, punching process, perforating process) and bending process (folding process) on a part of the plate, for example.

That is, in the embodiment, rear locking sections 422, a front locking section 423, a locking piece 425 and such like are formed by performing shearing process on apart of one long plate to form the parts to be through-holes 424a and 424b, the rear locking sections 422, the front locking section 423, the locking piece 425 and such like and performing bending process on the plate.

Further, the holding frame main body 421 is formed by performing bending process on the long plate to make the end portions in the longer direction contact each other and fixing them by welding, bonding and such like.

Here, the forming method of the holding frame body 42, shape of each part and such like are not limited to the example illustrated here.

The slide members 43a and 43b are held in the holding frame body 42, include insertion projections 432a and 432b which are second connecting sections that can protrude and retract from a pair of projection in/out holes 403 which are hole sections, and can slide in the extending direction (that is, in the width direction Y of the segment member 4) of the long holes 415a and 415b by slide operation of the controller S.

In the embodiment, the slide members 43 include the slide section main bodies 431 (that is, the slide section main bodies 431a and 431b and hereinafter, mere "slide section main bodies 431" includes both of them) and insertion projections 432a and 432b each of which is provided at one end of each of the slide section main bodies 431.

The slide member 43 can be located at a protruding position where the insertion projection 432 protrudes from the projection in/out hole 403 and at a housing position where the insertion projection 432 is housed in the projection in/out hole 403 by the operation of the external controller S.

Insertion holes 433 (that is, insertion holes 433a and 433b and hereinafter, mere "insertion holes 433" includes both of them) as hole sections to which the controller S can be inserted are formed at positions corresponding to long holes 415a and 415b of the outer frame member 41 on the slide members 43a and 43b, respectively.

In the embodiment, the insertion holes 433 are formed at positions on the slide section main bodies 431a and 431b corresponding to the long holes 415a and 415b and the through-holes 424a and 424b, respectively.

The circumferential portion of each of the insertion holes 433 on the top side surface (that is, top side of the segment member 4) of the slide section main boy 431 is a stepped section 435 which is thicker than other portions of the slide section main body 431.

In the embodiment, the insertion hole 433 is formed in a tapered-shape in section so as to become smaller in diameter as approaching the tip of the insertion direction (that is, the side of the top surface of the slide section main body 431 (the side of the top surface of the segment member 4)).

Thus, it is easy to insert the tip of the controller S into the insertion hole 433 when inserting the controller S from outside.

Also, the diameter of the tip of the insertion hole 433 in the insertion direction is smaller than the diameter of the tip of the controller S so that the tip of the controller S does not protrude from the topside (that is, the side of top surface of the segment member 4) of the slide section main body 431.

Here, the insertion hole 433 only needs to be an insertion portion in which the tip of the controller S can be inserted and the shape of the insertion hole 433 is not limited to the example illustrated here.

For example, the insertion portion may be a concave section, a slit portion or such like which is not penetrated.

In the embodiment, the slide member 43 is formed of a plate including metallic material such as stainless steel and is formed in a predetermined shape by performing pressing process such as shearing process (shearing process, punching process, perforating process) and bending process (folding process) on a part of the plate, for example.

That is, each of the insertion projections 432a and 432b is formed by performing bending process on the one end portion after one plate is processed to be the predetermined shape, for example.

Further, the insertion hole 433 is formed at a nearly central portion of the slide section main body 431 by the shearing process and such like.

Here, the forming method of the slide member 43, the shape of each portion and such like are not limited to the example illustrated here.

For example, insertion projections 432a and 432b may be formed as other members and be bonded to the slide section main body 431 by welding and the like to form the slide member 43.

The elastic member 44 is provided between the slide member 43 and the outer frame member 41 and biases the slide member 43 in the opposite direction of the insertion direction of the controller S.

In the embodiment, the elastic members 44a and 44b are provided on the top side surface of the slide members 43a and 43b (that is, top side of the holding frame body 42 and the like), respectively.

The elastic member 44 is formed of a plate spring, for example.

Since load adjustment is easy and load variation is small in the plate spring, the slide member 43 can be biased stably when the elastic member 44 is formed of a plate spring.

Here, the configuration of the elastic member 44 is not limited to a configuration where a plate spring is used.

In the embodiment, the elastic member 44 includes two supporting sections 443 and 444 and spring section 441 which is provided so as to be bridged between the supporting sections 443 and 444.

As shown in FIG. 7A, in the embodiment, a tip of the supporting section 443 is inserted into an end portion at the rolling side of each of the insertion projections 432a and 432b of the slide members 43a and 43b which are formed by bending process.

Thus, the bias force of the elastic member 44, movement when the elastic member 44 is elastically deformed and such like are transmitted to the whole slide member 43 in a balanced manner and the slide member 43 can be stabled.

In the embodiment, the elastic member 44 is fixed to the slide section main body 431 of the slide member 43 by fixing the supporting section 444 to the slide section main body 431 by a method of welding, bonding and such like.

Here, the method of fixing the elastic member 44 to the slide member 43 is not limited to the example illustrated here.

For example, the elastic member 44 may be fixed to the slide member 43 by fixing the supporting section 443 to the slide member 43 by welding.

The spring section 441 is pressed to contract in the insertion direction of the controller S when pressed down by the controller S, and restores to the original position by the spring force when the press is released.

The central portion of the spring section 441 is a hole section 442 and the stepped section 435 provided at the circumferential portion of the insertion hole 433 of the slide section main body 431 passes through the hole section 442 when the hole section 442 is pressed down by the controller S.

The stepped section 435 functions as a stopper by abutting the inner surface of the holding frame body 42 before the spring section 441 becomes planate and crashed by the press.

Thus, even in a case where the press operation by the controller S is repeated, the spring section 441 is not crashed and the spring force of the spring section 441 is maintained.

In the embodiment, the connecting unit 40 which connects segment members 4 includes the above outer frame member 41, the holding frame body 42, the slide member 43, the elastic member 44 and the locking piece 425. The convex section 401 of the first segment member 4 engages with the concave section 402 of the second segment member 4 which is adjacent to the first segment member 4 and the insertion projections 432a and 432b of the slide members 43 of the first segment member 4 are housed inside the projection housing section 404 of the second segment member 4 which is adjacent to the first segment member 4 so that the adjacent segment members 4 are connected to each other.

Next, the operation of the connecting unit 40 of the segment member 4, the band 3 and the wristwatch 1 as an electronic device including the band in the embodiment will be explained with reference to FIG. 8 to FIG. 11, for example.

In the embodiment, when a segment member 4 is formed, first, two slide members 43a and 43b are formed and an elastic member 44 is fixed on the top side surface of each of the slide members 43a and 43b by welding and such like.

Also, a holding frame body 42 is formed from one plate and the two slide members 43a and 43b to which the elastic members 44 are fixed are housed in the holding frame body 42 so that the back side surface of the slide members 43a and 43b is positioned on the side where the through-holes 424a and 424b of the holding frame body 42 are provided.

Further, an outer frame member 41 is formed from one plate and before bending process is performed on a connecting section 412, the holding frame body 42 in which the slide members 43a and 43b and others are housed is placed in a housing space of a frame member main body 411 so that insertion projections 432a and 432b are disposed at the side where the connecting section 412 is provided and the side where through-holes 424a and 424b of the holding frame body 42 are provided is upper side (the upper side in FIG. 3).

Thereafter, bending process is performed on the connecting section 412 to bond the frame member main body 411 and the covering section 413 by welding and such like. Thus, the segment member 4 is completed.

Then, a band 3 is completed by connecting a plurality of the segment members 4 to each other by the connecting units 40 in the connecting direction.

Further, the wristwatch 1 including the band 3 is completed by connecting one end side of the completed band 3 to the case 2 of the wristwatch 1 which is an outer case of the electronic device.

When a part of the segment members 4 constituting the band 3 is removed, the connection of the segment member 4 which is to be removed (the segment member 4 located at the lower side in FIGS. 9 to 11, for example) is released by sliding the slide members 43a and 43b constituting the connecting unit 40 by slide operation of an external controller S.

Specifically, first, the external controller S is inserted into the segment member 4 to be removed through either of the long hole 415a and 415b and through hole 424a and 424b, and the tip of the controller S is inserted to the insertion hole 433a or 433b of the slide member 43a or 43b (FIG. 8A shows a case where the controller S is inserted into the insertion hole 433a of the slide member 43a).

Then, the slide member 43a is pressed in the insertion direction by the controller S until the stepped section 435 of the slide member 43a abuts the inner surface of the holding frame body 42.

Thus, the spring section 441 of the elastic member 44a is compressed, the slide member 43a is pressed down to the position where the inner surface of the slide member 43a does not abut the side portion of the locking piece 425 and the locked state of the slide member 43a by the locking piece 425 is released (see FIG. 8B, for example).

In this state, the slide member 43a slides in the extending direction of the long holes 415a and 415b by being pressed by the controller S.

The slide member 43a can slide toward the central portion in the width direction Y (that is, in the extending direction of the long holes 415a and 415b) of the segment member 4 by being pressed down to get under the locking piece 425 by the controller S.

After the slide member 43a moves until the inner surface of the slide member 43a abuts the front locking section 423, when the pressed state by the controller S is released, the slide member 43a is pushed up to the opposite direction of the pressed direction by the controller S by bias force of the elastic member 44a and becomes locked in a state of abutting the lower surface of the locking piece 425.

Figure 10:
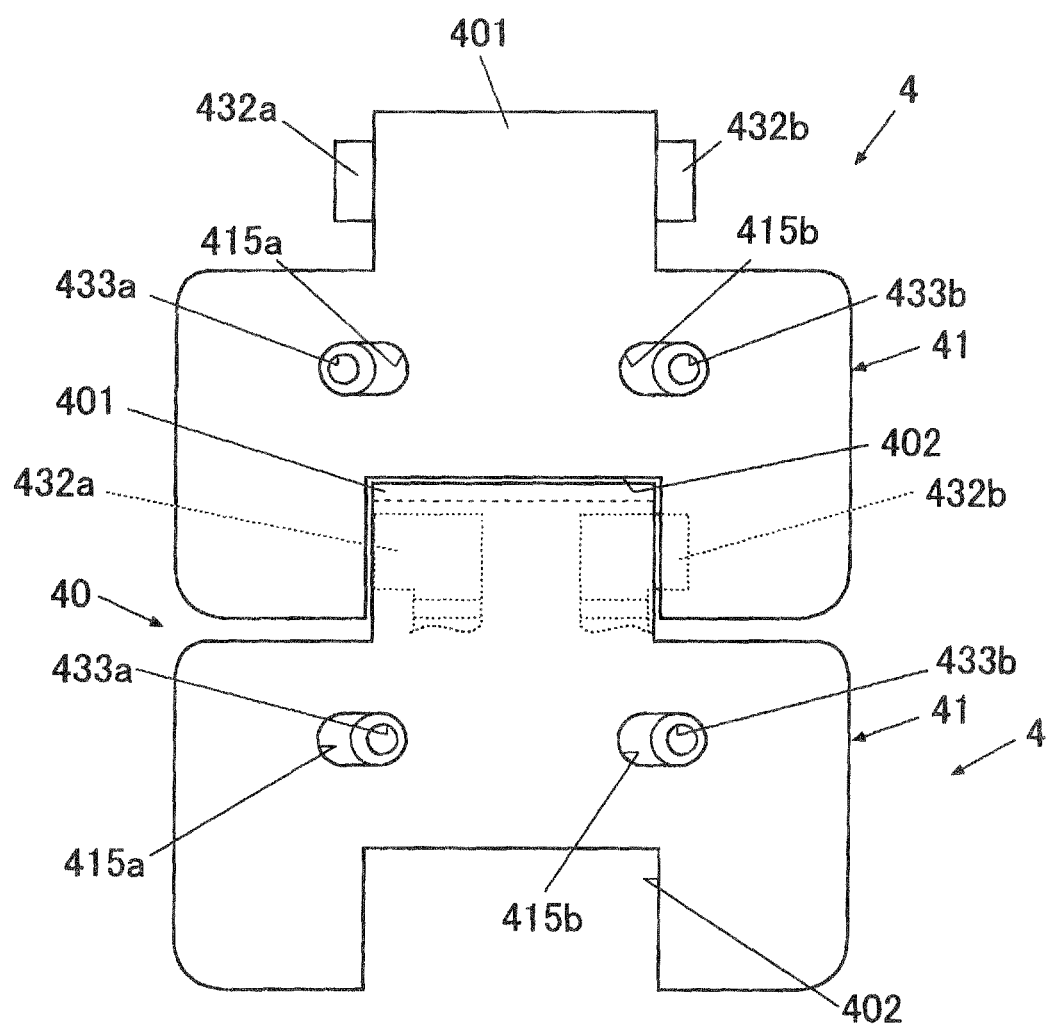
FIG. 10 is a pattern diagram showing a state where one of the insertion projections is housed in a projection in/out hole.

In this state, the slide member 43*a* is held at a housed position where an insertion projection 432*a* is housed in a projection in/out hole 403 (see FIGS. 8C and 10, for example).

Further, the other slide member 43*b* is similarly locked in a state of abutting the lower surface of the locking piece 425 by sliding by using the controller S.

Figure 11:
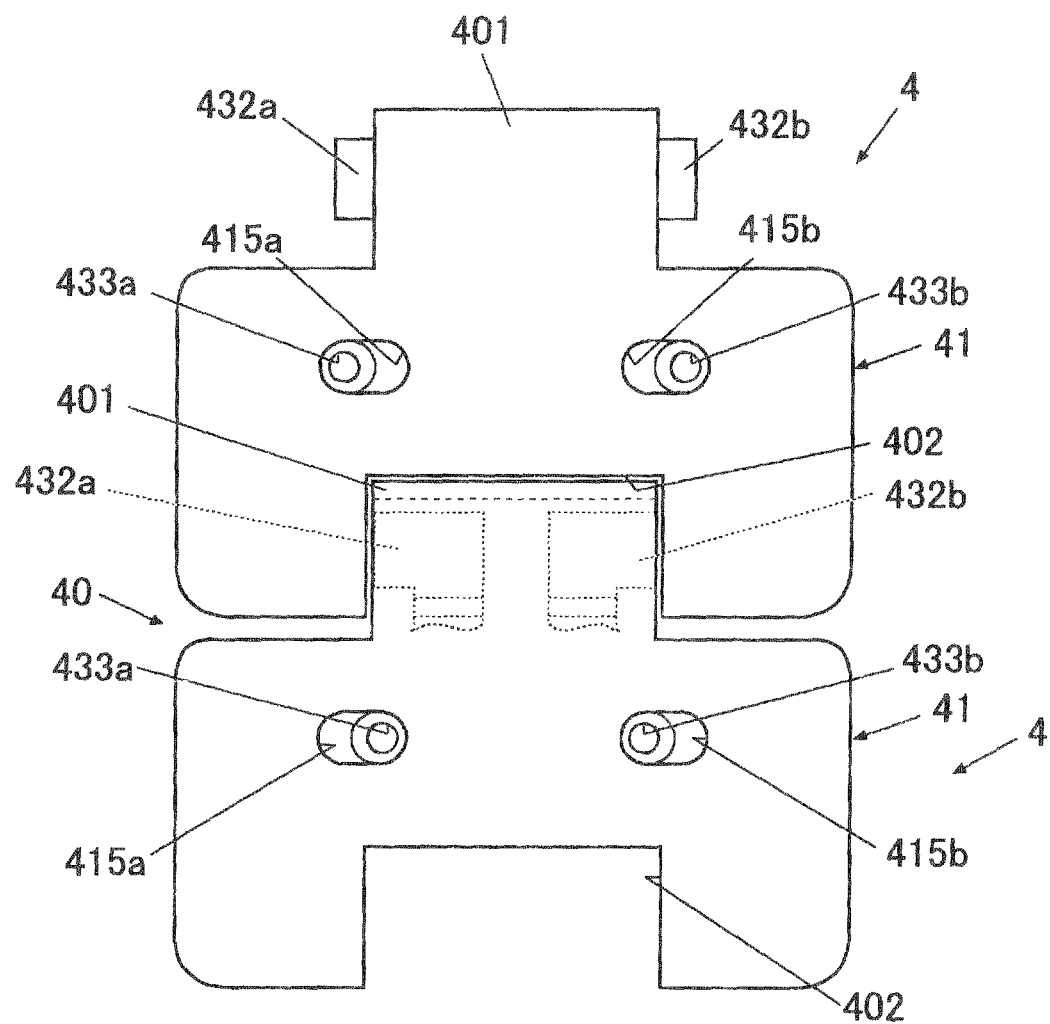
FIG. 11 is a pattern diagram showing a state where two insertion projections are housed in a projection in/out hole.

In this state, the slide member 43*b* is held at a housed position where an insertion projection 432*b* is housed in a projection in/out hole 403 (see FIGS. 8D and 11, for example).

Thus, the connection of the segment member 4 by the connecting unit 40 is released and the segment 4 can be removed easily.

Here, on the other hand, in a case where the segment members 4 are to be connected by the connecting unit 40, as shown in FIG. 3, the slide members 43*a* and 43*b* of the segment member 4 to be connected slide by using the controller S so as to be pressed into the lower side of the locking piece 425, and the slide members 43*a* and 43*b* are locked at a housed position where the insertion projections 432*a* and 432*b* are housed in the projection in/out hole 403 of the segment member 4.

Thereafter, the convex section 401 of the segment member 4 is engaged in the concave section 402 of a segment member 4 which is the connecting destination, and then the slide members 43*a* and 43*b* are pressed in the insertion direction of the controller S by using the controller S again and the locked state by the locking piece 425 is released.

Then, the slide members 43*a* and 43*b* slide to the direction away from the locking piece 425 and the insertion projections 432*a* and 432*b* protrude from the projection in/out hole 403 of the segment member 4 to be connected.

By releasing the pressed state by the controller S in this state, by the bias force of the elastic member 44*a*, the slide member 43*a* is pushed up to the opposite direction of the pressed direction by the controller S and the inner surface of the slide member 43*a* can abut the side portion of the locking piece 425.

Figure 9:
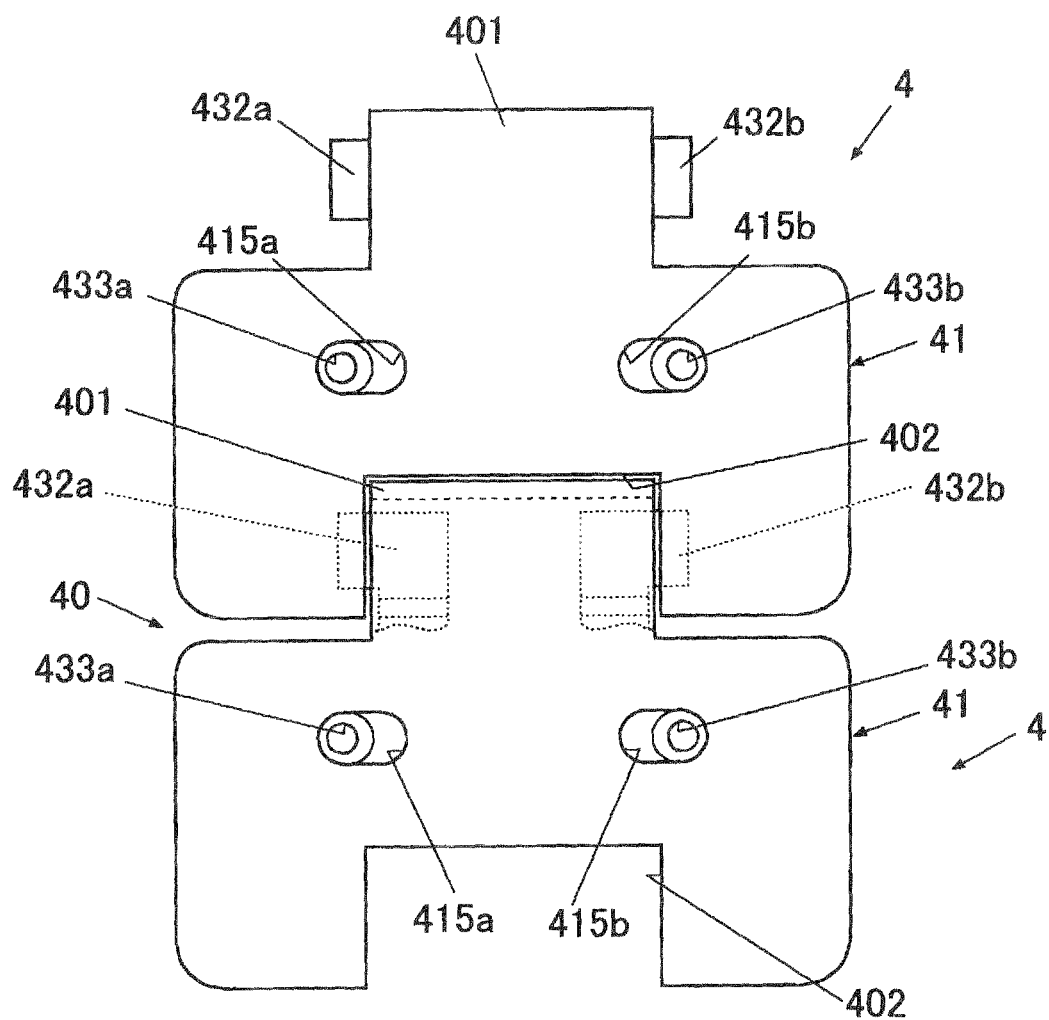
FIG. 9 is a pattern diagram showing a state where two insertion projections are housed in a projection housing section of adjacent segment members.

Therefore, the slide member 43*a* cannot slide to the more central portion in the width direction Y than the locking piece 425 and the slide members 43 are locked at a protruding position where the insertion projections 432*a* and 432*b* protrude from the projection in/out hole 403 of the segment member 4 to be connected (see FIG. 9, for example).

Thus, the connection between the adjacent segment members 4 by the connecting unit 40 is completed.

As mentioned above, in the embodiment, slide members 43*a* and 43*b* which include insertion projections 432*a* and 432*b* housed in a projection housing section 404 of a segment member 4 to be connected can slide in the width direction Y (that is, the extending direction of the long hole) of the segment member 4 by the slide operation of the external controller S.

Further, the slide members 43*a* and 43*b* can be locked at a protruding position where the insertion projections 432*a* and 432*b* protrude from a projection in/out hole 403 of the segment member 4 to be connected and at a housed position where insertion projections 432*a* and 432*b* are housed in a projection in/out hole 403 of the segment member 4.

Thus, in contrast to the case where the segment members are connected with each other by using a pin member or the like, falling off, losing and such like of a part (a pin member, for example) do not occur.

Further, a segment member can be easily attached and removed without a special tool or technique if there is an external controller S such as a toothpick.

Thus, a general user can easily attach and remove a segment member and adjust band length to an arbitrary length when band length needs to be adjusted after purchase of the wristwatch and such like or when length of the band purchased by mail order needs to be adjusted, for example.

In addition, in the embodiment, insertion holes 433*a* and 433*b* to which a controller S can be inserted are formed in the slide members 43*a* and 43*b* at positions corresponding to long holes 415*a* and 415*b* of the outer frame member 41.

Thus, the slide members 43*a* and 43*b* can slide more surely by the controller S.

Here, though an embodiment of the present invention has been described above, the present invention is not limited to the embodiment and it goes without saying that various changes can be made within the scope of the present invention.

For example, in the embodiment, there is described a case where a pair of slide members 43*a* and 43*b* are housed in the holding frame body 42 and the slide members 43*a* and 43*b* include elastic members 44*a* and 44*b*, respectively, and slide in the width direction of the segment member 4, and thus, the insertion projections 432*a* and 432*b* can be protrude and retract from the projection housing section 404 of the segment member 4 to be connected, as an example.

However, the present invention is not limited to the case where a pair of slide members 43*a* and 43*b* and a pair of elastic members 44*a* and 44*b* are provided.

For example, the configuration may be such that either of the insertion projections 432*a* and 432*b* is a fixed projection and only the other projection can protrude and retract from the projection housing section 404 of the segment member 4 to be connected.

In this case, when a segment member 4 is attached or removed, the segment member 4 can be removed from a segment member 4 to which the segment member 4 is connected to by tilting the segment member 4 in a state where a projection which can protrude and retract is housed in the projection in/out hole 403.

In addition, the embodiment is explained by taking a case where the outer frame member 41 is formed by performing bending process and such like on one plate formed of a metallic material as an example. However, configuration of outer frame member 41, method of forming outer frame member 41 and such like are not limited to the example illustrated here.

Also, an outer frame member 41 may be formed by separately forming a frame member main body wherein the upper surface is opened and a housing space is included inside and a covering member which covers the opening, and by bonding the separate parts by welding, bonding or the like.

Further, though the embodiment takes a case where the slide member 43 is housed in the outer frame member 41 in a state of being housed in the holding frame body 42 as an example, the segment member 4 may not include the holding frame body 42.

In this case, rear locking sections, a front locking section and such like for locking the slide member 43 at a predetermined position as well as a locking piece are provided on the outer frame member 41, and the slide member 43 is positioned at a predetermined position and can be located at a protruding position where the insertion projection 432 protrudes and at a housing position where the insertion projection is housed, for example.

Also, materials forming the outer frame member 41, the holding frame body 42 and the slide member 43 are not limited to metallic materials such as stainless steel.

For example, the material may be a resin or such like in which carbon fiber is mixed.

Also, materials forming the outer frame member 41, the holding frame body 42 and the slide member 43 do not need to be the same.

For example, the outer frame member 41 may be formed by metallic material such as stainless steel, titanium and gold and the holding frame body 42 and the slide member 43 may be formed by resin and such like.

Here, when the outer frame member 41, the holding frame body 42 and the slide member 43 are formed by resin and such like, a mold may be prepared in advance to perform integral molding of arbitrary shape.

In addition, though the embodiment takes a case where each of insertion holes 433a and 433b to which a controller S can be inserted is formed at a position corresponding to each of the long holes 415a and 415b of the outer frame member 41 in the slide members 43a and 43b as an example, the insertion holes 433a and 433b may not be provided.

In this case, for example, it is preferable that concavity and convexity and such like as slip resistance are provided on a surface of the slide members 43a and 43b.

Also, the embodiment takes a case where the portion where the band 3 is attached to a case 2 which is an outer case is also formed of the same segment member 4 as the segment member 4 which forms the connecting unit 40 as an example.

However, a connecting segment member different from the segment member 4 which forms the connecting unit 40 may be used for the portion where the band 3 is attached to the outer case such as the case 2.

By such configuration, the band according to the present invention can be attached to the outer case which includes a band attaching section of various types of shapes.

Further, the embodiment is explained by taking a case where an electronic device to which the band 3 is attached is a wristwatch 1 as an example.

However, the electronic device only needs to include a band 3 which is configured by connecting a plurality of segment members 4, and is not limited to the wristwatch 1.

For example, the electronic device may be a pedometer, a heart rate meter, a display unit of altitude and such like, portable player and such like.

Further, though the embodiment is explained by taking a case where the band 3 is attached to the wristwatch 1 which is an electronic device as an example, the band 3 can be widely applied if the segment members 4 are to be connected by a connecting unit.

For example, the present invention can be applied even to a band such as a bracelet which is used alone or a band which is used by being attached to a decorative member.

Though several embodiments of the present invention have been explained as mentioned above, the scope of the present invention is not limited to the above-mentioned embodiments and includes a scope of the invention described in claims and the equivalents thereof.

The entire disclosure of Japanese Patent Application No. 2011-272119 filed on Dec. 13, 2011 including description, claims, drawings, and abstract are incorporated herein by reference in its entirety.

What is claimed is:

1. A connecting unit for connecting adjacent segment members to each other, the connecting unit comprising:
    an outer frame member, the outer frame member comprising:
        a protruding portion which protrudes at a first side of the outer frame member, the protruding portion protruding in a connecting direction in which the adjacent segment members are connected to each other;
        a pair of hole sections, each hole section of the pair of hole sections being provided at a respective side of the protruding portion;
        a receiving portion which is provided at a second side of the outer frame member in the connecting direction and into which the protruding portion is receivable;
        a pair of first connecting sections which are provided in the receiving portion at positions corresponding to the pair of hole sections of the protruding portion when the protruding portion is received in the receiving portion; and
        long holes for into which a controller is insertable, the long holes being formed so as to extend in an extending direction which is orthogonal to the connecting direction;
    a holding frame body which is housed in the outer frame member and which includes through-holes at positions corresponding to the long holes;
    slide members which are held in the holding frame body, wherein each slide member includes a second connecting section which protrudes and retracts from the pair of hole sections, and wherein the slide members are slidable in the extending direction of the long holes by a slide operation of the controller;
    elastic members which are respectively provided between the slide members and the outer frame member and which bias the slide members to an opposite direction of an insertion direction of the controller; and
    a locking member which locks the slide members at positions where connection between their respective second connecting sections and respective ones of the pair of first connecting sections of the adjacent segment members is releaseable by the controller sliding the slide member in the extending direction of the long hole against the elastic bias force of the elastic member.

2. The connecting unit according to claim 1, wherein one of a concave section and a hole section into which the controller is insertable is formed in each of the slide members at a position corresponding to a respective one of the long holes of the outer frame member.

3. A band, comprising:
    the connecting unit of claim 1, wherein the band is formed by connecting a plurality of the segment members.

4. An electronic device, comprising:
    the band of claim 3; and
    an outer case to which the band is attached.

* * * * *